J. F. WILLIAMS.
ACETYLENE GAS GENERATOR.
APPLICATION FILED MAY 11, 1911.
1,047,902.
Patented Dec. 17, 1912.
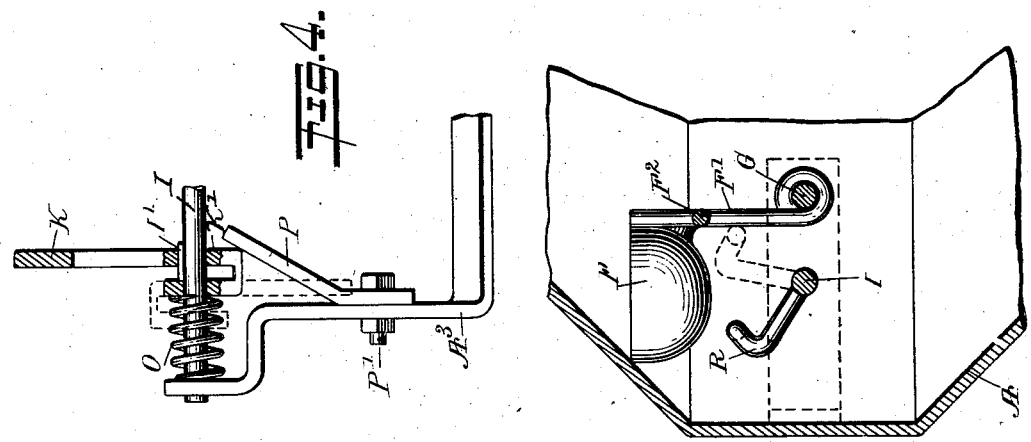
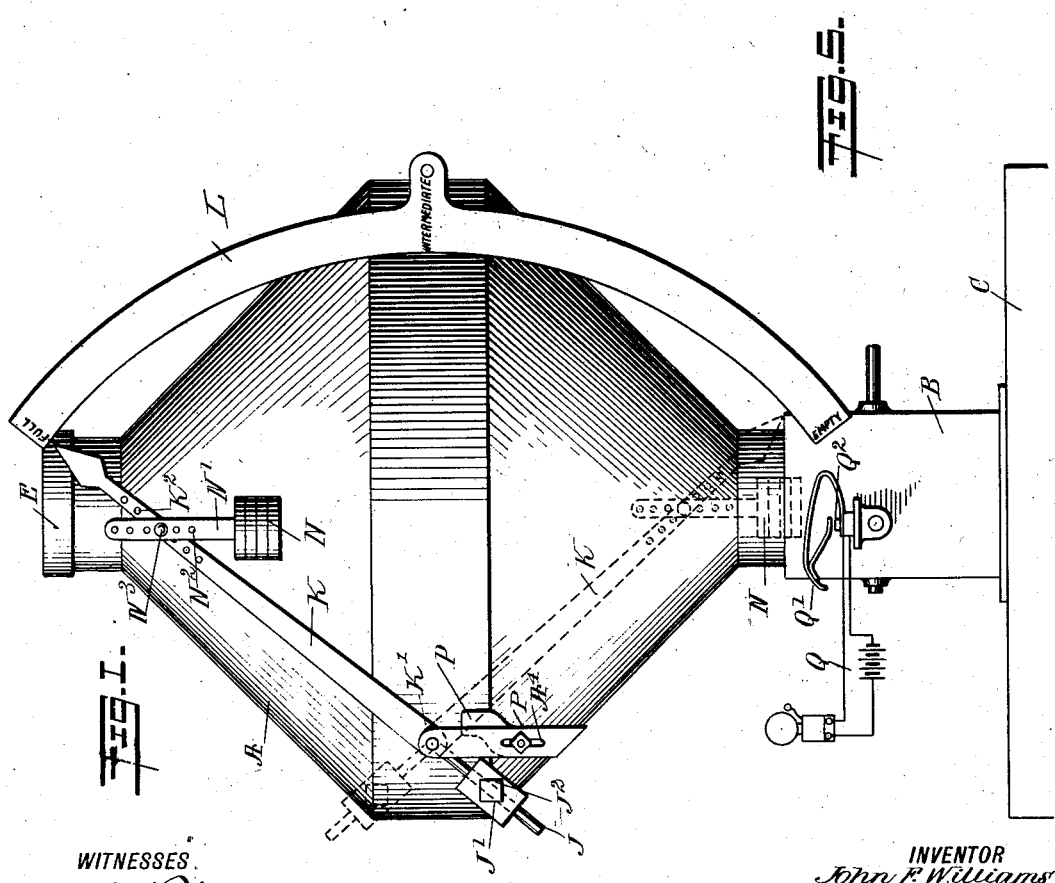

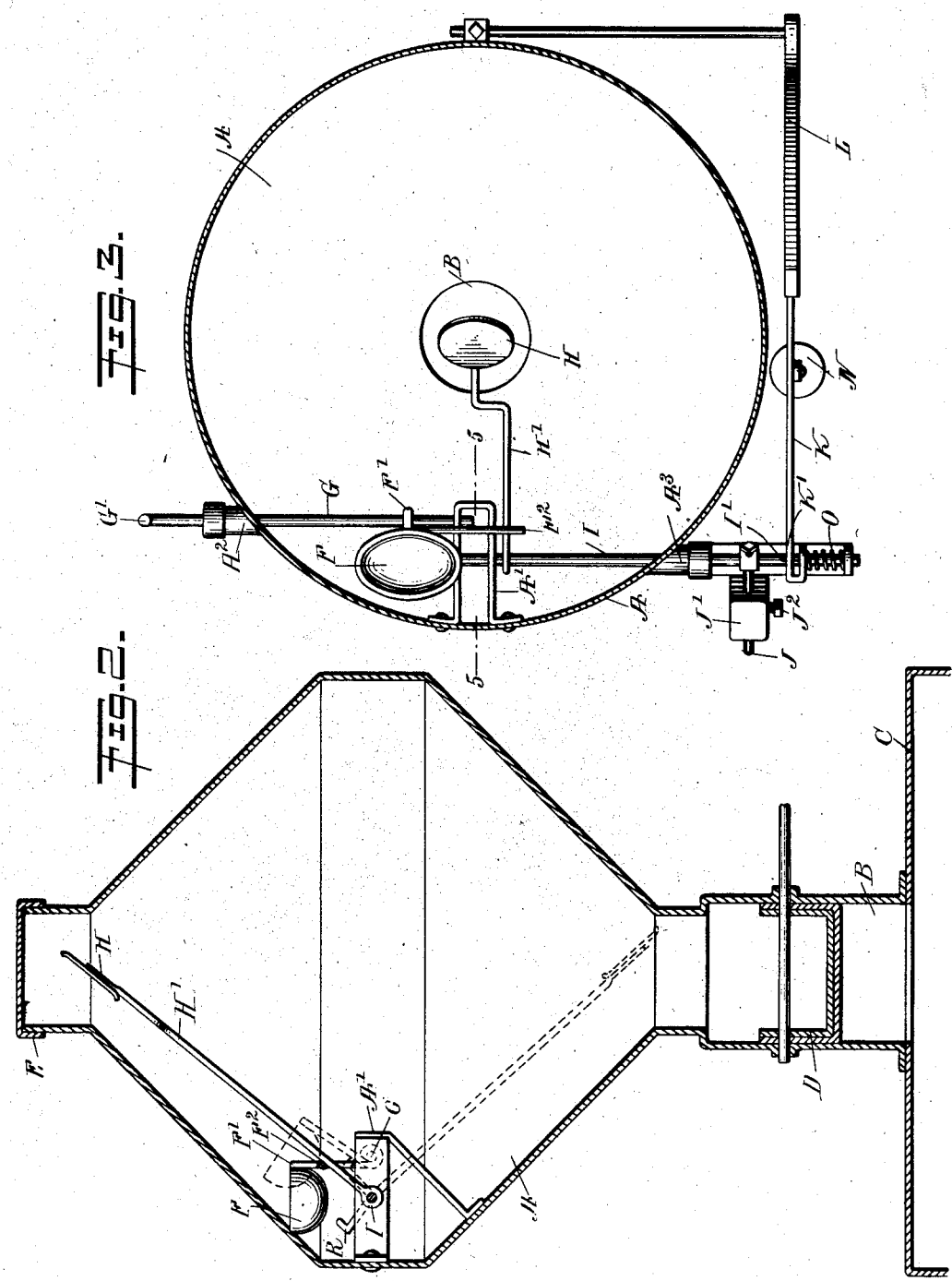

UNITED STATES PATENT OFFICE.

JOHN F. WILLIAMS, OF WASSAIC, NEW YORK.

ACETYLENE-GAS GENERATOR.

1,047,902. Specification of Letters Patent. Patented Dec. 17, 1912.

Original application filed October 3, 1910, Serial No. 584,997. Divided and this application filed May 11, 1911. Serial No. 626,409.

*To all whom it may concern:*

Be it known that I, JOHN F. WILLIAMS, a citizen of the United States, and a resident of Wassaic, in the county of Dutchess and State of New York, have invented new and useful Improvements in Acetylene-Gas Generators, of which the following is a full, clear, and exact description, this being a division of the application for Letters Patent of the United States, No. 584,997, filed by me October 3, 1910.

The object of the invention is to provide certain new and useful improvements in acetylene gas generators, whereby the amount of carbid in the feed hopper is indicated at all times and an alarm is sounded whenever the carbid in the feed hopper reaches a low stage, and whereby a supplementary charge of carbid within the feed hopper may be added to permit of running the acetylene gas generator another length of time, say overnight, before being required to recharge, thus avoiding recharging during the night or running out of gas and thereby avoiding the consequent extinguishing of the lights.

A practical embodiment of the invention is represented in the accompanying drawings forming a part of this specification, in which similar characters of reference indicate corresponding parts in all the views.

Figure 1 is a side elevation of the improvement; Fig. 2 is a vertical section of the same; Fig. 3 is a plan view of the same and showing the feed hopper in section; Fig. 4 is an enlarged elevation of the automatic re-setting device for the follower; and Fig. 5 is an enlarged sectional side elevation of part of the supplementary charging device, the section being on the line 5—5' of Fig. 3.

The feed hopper A for containing the carbid may be of any approved shape and construction, and is connected at its lower end by a neck B with the generator C, of the usual construction, the neck B containing the usual device D for periodically controlling the amount of carbid to be passed from the feed hopper A into the generator C. The upper end of the hopper A is provided with the usual filling tube E for periodically charging the hopper A with carbid. The parts so far described are similar to those now used in acetylene gas generators and hence form no part of my improvement.

Within the feed hopper A is arranged a container F, preferably in the form of a small cup, attached to the upper end of an arm F' secured to a transversely-extending shaft G journaled in suitable bearings A', A² arranged on the feed hopper A, one end of the shaft G extending to the outside of the feed hopper and terminating in a handle G' adapted to be taken hold of by the operator to turn the shaft G, so as to swing the cup F from its normal position shown in Figs. 2 and 3, downward into a dumping position, to discharge the calcium carbid contained in the container F into the hopper A for transmission through the neck B into the gas generator C. By arranging the container F within the feed hopper A it is evident that when the feed hopper is filled with the carbid then the container F is also filled with the carbid, and when the acetylene gas generator is in use the carbid contained in the hopper A is gradually fed to the generator according to the gas consumption, but as the carbid moves out of the hopper A the carbid contained in the container F remains in there, and when the carbid has been discharged from the hopper A and the lights begin to go out then the operator in charge can turn the handle G' so as to tilt the container F into dumping position, whereby the carbid from the container F is dumped into the hopper A to pass by way of the neck B into the generator C, to generate a sufficient amount of gas for keeping the lights burning during the night. Thus by the arrangement described, the operator is not required to recharge the feed hopper A with carbid during the night and hence this dangerous proceeding is avoided. The feed hopper A can be recharged next day in the usual manner, through the filling tube E.

In order to provide a visible means for indicating the amount of carbid contained in the feed hopper A, use is made of a follower H in the form of a plate, adapted to rest on top of the carbid contained in the feed hopper A, the said plate H being attached to an arm H' secured to the shaft I, journaled at its inner end in the bearing A' and at its outer end in the bearing A³. On the outer end of the shaft I is secured an arm J, on which is adjustably held a weight J' by the use of a set screw J². On the shaft I outside of the hopper A is arranged a key I' engaging a key-way on the pivotal end K' of a pointer K, indicating on a fixed scale L, having marks representing pounds or other weight or measure. On the pointer K is adjustably held a weight N for imparting a downward swinging action to the pointer K to hold the follower H in contact with the top of the carbid held in the feed hopper A, the said weight N overbalancing the weighted arm J. A spring O presses against the fulcrum end K' of the pointer K, to hold the latter normally in the position shown in Figs. 3 and 4, that is, in engagement with the key I', and the said fulcrum end K' of the pointer K is adapted to engage a cam P, so that when the pointer K swings downward the cam P shifts the fulcrum end K' of the pointer K lengthwise on the shaft I and against the tension of the spring O, and when the pointer K reaches a lowermost position then the fulcrum end K' of the pointer K is out of engagement with the key I', so that the shaft I is free to turn by the action of the weighted arm J, to swing the follower H upward into its uppermost position, in a manner presently to be described and as indicated in Figs. 2 and 3. The cam P is held vertically adjustable on the bearing A³ by the use of a bolt P' engaging an elongated slot A⁴ in the said bearing, see Fig. 1. By adjusting the cam P up or down the follower H can be released sooner or later during its downward swinging movement according to the amount of carbid desired to be in the bottom of the hopper A at the time of releasing the follower.

On the arm F' of the container F is arranged a transversely-extending pin F² adapted to be engaged by the arm H' of the follower H when the latter swings upward, and the container F is returned to normal vertical position by the arm H' when the latter returns to its uppermost position. The weight N is adapted to engage a spring contact arm Q' and press the same downward into engagement with a fixed contact point Q² of an electric alarm Q, of any approved construction, so as to close the electric circuit and sound the alarm Q at the time the pointer K reaches a lowermost position, that is, at the time the carbid has been discharged from the hopper A. Thus when an alarm is sounded, the operator in charge can attend to the recharging of the feed hopper A. By adjusting the weight N on the pointer K the alarm can be sounded sooner or later, that is, if desired, the alarm can be sounded when the carbid has been completely discharged from the hopper A, or when a certain amount, say five or ten pounds, is still contained in the said hopper. For the purpose mentioned, the weight N is provided with a stem N' having a plurality of apertures N², any one of which can be engaged by a pin N³ adapted to be engaged with one of a series of apertures K² formed in the pointer K. Thus by engaging the pin N³ with any one of the apertures N², K², the weight N may be adjusted to engage the contact Q' sooner or later, as above mentioned. On the shaft I is secured an arm R within the hopper A and adapted to engage the arm F' carrying the container F, so that when the shaft I is turned by hand or by the action of the pointer K the follower H at the time the pointer K reaches a predetermined lowermost position, then the arm R engages the arm F' and imparts a swinging motion to the same, to tilt the container F into a dumping position, and thus empty its contents into the hopper A. It is understood that the container F can be moved into dumping position, either automatically as above described or by the operator turning either the shaft C or the shaft I. The shaft I can be turned by the operator taking hold of the arm J or the pointer K.

The operation is as follows: When the feed hopper A is filled with carbid then the container F is likewise filled, and the several parts are in the position as indicated in the drawings. Now as the carbid is periodically discharged from the feed hopper A and its level sinks in the said hopper, the follower H moves downward with the top or level of the carbid owing to the action of the overbalancing weight N on the pointer K attached to the shaft I carrying the arm H' of the follower H. When all or nearly all of the carbid has left the feed hopper A then the weight N bears on the contact spring arm Q' to press the same downward in engagement with the point Q² to close the circuit and thus sound an alarm, so that the operator in charge can turn the shaft G or I to tilt the container F and thus empty the contents into the hopper A, thereby providing a supplemental charge of the carbid. In case the attendant fails to tilt the container F then a further downward movement of the follower H causes the arm R to tilt the container F, so that the supplemental charge of carbid is dumped into the hopper A, it being understood that by the use of the spring arms Q' the weight N can slide over the spring arm to allow the follower to pass into an extreme lowermost position.

It is understood that the weight N may contact with and rest upon the spring Q' until the pointer is raised, or the weight N may merely contact momentarily with the spring Q' and then slide past it according to the adjustment of the weight N on the lever K by the use of the pin N³ engaging corresponding holes N², K².

From the foregoing it will be seen that the supplemental charge can be dumped into the feed hopper A by hand or automatically, and the device can be set to set off the alarm either when there is no carbid left in the feed hopper, or a small quantity, say five or ten pounds, as the case may be. It will also be noticed that as the follower H moves downward with the carbid in the hopper A, the pointer K indicates on the scale L the exact amount of carbid remaining in the hopper, so that the attendant can see at a glance how much carbid there is left in the hopper A. It will also be noticed that the follower H automatically returns to its uppermost position after the carbid is discharged from the hopper A and wholly independent of the pointer K, which latter has to be raised by hand when refilling the feed hopper A. The follower H and its arm H' during their downward movement press on the carbid and thereby assist in feeding the carbid downward. The follower H and its arm H' may be actuated by hand from the outside on turning the shaft to disturb the carbid in case the same should be clogged.

By the arrangement described it is wholly unnecessary to open and fill the feed hopper at night, as the reserve supply in the container F can be dumped as soon as the regular supply is exhausted, by simply turning the handle G'. The pointer K and the scale L form a visible reminder for the attendant, as they indicate the exact amount of carbid in the feed hopper A, and in addition an alarm is sounded as soon as the carbid reaches a low stage in the feed hopper. It will further be noticed that by the arrangement described, the container F may be dumped either before or after sounding the alarm. The adjustable devices are located outside of the apparatus and are hence within reach of the operator at any time and enable him to set or actuate the devices to suit his convenience and desires.

It is understood that the weight N may be set to make contact with the spring Q' at the time the hopper A still contains, say, ten pounds of carbid, and thus when the alarm is sounded the operator in charge knows that ten pounds of carbid are still in the hopper and a supply is also in the cup F, which has not been dumped but may be dumped within the hopper, if so desired, or the hopper may be refilled without the cup having been dumped. Thus the arrangement described forms an indicator of the feed supply independent of the pointer K and scale L.

Having thus described my invention, I claim as new and desire to secure by Letters Patent:

1. An acetylene gas generator provided with a feed hopper, a follower within the said hopper and having an arm and a plate adapted to rest on top of the carbid in the said feed hopper, a transverse shaft in the said feed hopper and carrying the said follower arm, the said shaft extending to the outside of the said feed hopper, a pointer on the outer end of the shaft, a fixed scale on which the pointer indicates and automatic means for returning the said follower to uppermost position independent of the said pointer.

2. An acetylene gas generator provided with a feed hopper, a follower within the said hopper and consisting of an arm and a plate adapted to rest on top of the carbid in the said feed hopper, a transverse shaft in the said hopper and carrying the said follower arm, the said shaft extending to the outside of the said feed hopper, a pointer on the outer end of the shaft, a fixed scale on which indicates the said pointer, a weight on the said pointer and automatic means for returning the said follower to uppermost position independent of the said pointer.

3. An acetylene gas generator, provided with a feed hopper, a follower within the said hopper and adapted to rest on top of the carbid in the said feed hopper, a shaft carrying the said follower and extending to the outside of the said feed hopper, a weighted arm on the said shaft to return the follower, a weighted pointer having a sliding and turning connection with the said shaft, and a cam adapted to be engaged by the said pointer to release the shaft from the weighted pointer and allow the follower to return to uppermost position.

4. An acetylene gas generator, provided with a feed hopper, a follower within the said hopper and adapted to rest on top of the carbid in the said feed hopper, a shaft carrying the said follower and extending to the outside of the said feed hopper, a weighted arm on the said shaft to return the follower, a weighted pointer having a sliding and turning connection with the said shaft, a cam adapted to be engaged by the said pointer to release the shaft from the weighted pointer and allow the follower to return to uppermost position, and means for adjusting the said cam to release the shaft sooner or later.

5. In an acetylene gas generator, the combination of a feed hopper, a container within the said feed hopper, a follower within the said hopper, a connection between the said follower and the said container to empty the latter, indicating means connected with the said follower for indicating the amount of carbid in the hopper and means actuated by the indicator whereby the said container and the said follower are restored to their uppermost position when the indicator reaches a predetermined point.

In testimony whereof I have signed my name to this specification in the presence of two subscribing witnesses.

JOHN F. WILLIAMS.

Witnesses:
THEO. G. HOSTER,
PHILIP D. ROLLHAUS.